United States Patent [19]

Callahan et al.

[11] Patent Number: 5,415,298
[45] Date of Patent: May 16, 1995

[54] RECORDED MEDIUM STORAGE CASE

[75] Inventors: Steven E. Callahan; Todd K. Dyment, both of Clinton, Mass.

[73] Assignee: Microplas, Inc., Clinton, Mass.

[21] Appl. No.: 159,291

[22] Filed: Nov. 30, 1993

[51] Int. Cl.⁶ ................................................ A47F 7/00
[52] U.S. Cl. .................................... 211/40; 312/9.55; 206/309
[58] Field of Search .................... 211/40, 41, 175; 312/9.47, 9.53, 9.55; 206/309, 387

[56] References Cited

U.S. PATENT DOCUMENTS

| | | |
|---|---|---|
| 1,182,233 | 5/1916 | Waddell . |
| 3,245,736 | 4/1966 | Douthit . |
| 3,391,792 | 7/1968 | Makar . |
| 3,666,337 | 5/1972 | Sztorc .................... 312/9.55 X |
| 3,811,745 | 5/1974 | Cylke . |
| 4,317,603 | 3/1982 | Pepicelli et al. . |
| 4,584,027 | 8/1987 | Wright . |
| 4,707,247 | 11/1987 | Savoy .................... 211/40 X |
| 4,741,438 | 5/1988 | Mastronardo et al. ........... 211/40 X |
| 4,790,926 | 12/1988 | Mastronardo et al. ........... 211/40 X |
| 4,793,665 | 12/1988 | King . |
| 4,819,802 | 4/1989 | Gutierrez .................... 206/387 |
| 4,889,244 | 12/1989 | Hehn et al. ................ 211/40 X |
| 5,297,675 | 3/1994 | Martucci .................... 211/40 X |

OTHER PUBLICATIONS

Allsop CD Rom Organizer.
Memorex CD Storage Unit.

*Primary Examiner*—Robert W. Gibson, Jr.
*Attorney, Agent, or Firm*—James Creighton Wray

[57] ABSTRACT

A compact disc and data cartridge storage has a base, a back, a front and first and second opposite sides. A plurality of parallel ribs extend along a rear portion of the base and a lower portion of the back for separating stored data packages. The base has a rear portion and a front portion respectively sloped rearward and forward from a center line which extends between the sides. The front portion is longer than the rear portion. Ribs extend upward from the front and rear position to guide and separate the data packages. In one form, the ribs extend fully along the back portion and partially along the front portion for storing tall and thin objects between the ribs, leaning against the back portion with centers of gravity rearward of the central ridge before tipping selected thin objects forward and moving the center of gravity forward of the central ribs and allowing the thin objects to slide downward along the front portion of the base while held vertically between the ribs. In one form, the ribs have a series of alternate short profile ribs and tall profile ribs. The short profile ribs are positioned nearest the sides and tall profile ribs are positioned intermediate the short profile ribs, with one more short profile rib than tall profile rib.

18 Claims, 3 Drawing Sheets

RECORDED MEDIUM STORAGE CASE

BACKGROUND OF THE INVENTION

This invention concerns storage cases for stored data media packages.

A walk through any electronic retailer clearly shows the plethora of compact disc (CD) storage devices for CD audio and CD ROM on the market. Most of those storage products can be categorized into one or two configurations. One is the tower concept, which is typically a floor mounted wooden or thick walled injection molded product which spins to display the title of each CD. The second and more popular configuration is the flip file unit. That is, the user stands with the large surface area of the CD towards him and flips the tops of the CD's in a fanning action.

Neither one of those configurations is acceptable for the computer CD ROM user. The CD ROM user values the area of a desk top and obviously does not have a room size area to store CD titles.

The majority, if not all, of the compact disc storage products in the market, CD ROM as well as CD audio, are relatively bulky and unattractive. One of the few products currently available incorporates "fingers" which hold the CD's in the upright position. Since that product is made of styrene and since the fingers are always under pressure when CD's are stored, it is expected the fingers will eventually lose their memory and not hold the CD's in an upright position.

Other CD storage systems available, whether using a flip method or tower method, often have $\frac{1}{4}''$ to $\frac{1}{2}'$ of material between each CD. That does not provide a dense pack for the CD user. Instead, there is much "dead space" in those other CD storage systems. The present case, with its thin separating fins between each disc, provides for compact storage.

The other CD storage products typically are several parts assembled together. Some storage systems even go so far as to use aluminum in their manufacturing. One organizer uses five heavy molded components which clearly add a substantial cost to this product.

A need exists for easier to use, more compact and more cost efficient data medium storage cases.

SUMMARY OF THE INVENTION

The invention solves and overcomes problems of the prior art by providing easier to use, more compact and more cost efficient data medium storage cases.

The case of the present invention has a base, sides, a short front stop and a tall, sloping back. A floor has a back part which slopes downward and rearward from an apex. A longer front part of the floor slopes downward and forward from the apex to a short front stop. Short, thin vertical parallel separators are joined to the bottom near the apex.

A distance between the apex and the back may be about half of a long dimension of a CD jewel box. The slope and length of the rear portion of the floor are coordinated so that a vertical line from a center of the jewel box is slightly rearward of the apex. The slide case holds several jewel boxes in vertical alignment, with the aligned spines tipped for easy reading of the titles. One high density embodiment of the invention features a compact design to hold ten CD's.

To select a CD, an upper corner of a selected CD jewel box is rocked forward and downward, repositioning a center of gravity forward of the apex. The selected boxed CD slides down the front portion of the floor until it reaches the front wall. The jewel box with exposed side walls is easy to lift out of the slide. After the CD is removed, the jewel box may be replaced in the forward position of the slide. After use, the CD is replaced in the box, and the jewel box may be replaced by sliding it rearward and allowing it to tip into its stored position. The jewel box is redeposited in the case in its tipped forward position, and then, with light finger pressure on the spine, is pushed back up the slope until the box rocks into its stored position.

In one embodiment, alternating dividers in the case are relatively short and relatively long. The case is used to store CD's in jewel boxes by resting the boxes on the floor of the case between dividers. Larger data cartridges may be stored in the same cases by resting the cartridges on the shorter dividers, with the taller dividers separating the cartridges. The shorter dividers are about equal in length to halves of the bases of the data cartridge storage boxes. When the boxes are tipped rearward on the dividers, gravity keeps the boxed data cartridges in the case. When a boxed cartridge is tipped forward, it slides forward along the curved short divider and then along the floor until the selected data cartridge box rests against the stop at the front of the case.

The case of the present invention is an innovative solution for storing CD's and data cartridges. The user stores CD titles in a vertical position without the need for flipping through compact discs to get to the ones behind. Once the case is filled with compact discs, the user simply presses down on the top of the disc he or she chooses, and the diskette slides down and stops in a tilted forward position.

This mechanism allows the user to remove a CD from its jewel box package and to place the box back in the down position. That expedites locating the empty jewel box when returning the CD back into storage.

The data case product is useful in storing relatively thick data cartridges and in storing both the audio CD's and computer CD ROM's. The product is intended for concurrent CD ROM data cartridge use.

The present invention has a clean simple design without a large amount of excess material such as in some of the other products.

The present invention has cost effectiveness. With its simple design, the present case has no moving parts to wear. The case of the present invention provides a better storage solution at a more cost effective price.

The new invention provides easy viewing of titles. The case features boxed CD's and data cartridges stored with their spine areas exposed. This "bookend" configuration allows the user to simply scan with his eyes along the spine labels and choose the appropriate title. There is no need to flip one CD to get to the one behind it.

The present case unit is sold in modules of ten. Those modules provide a C-clip or other connecting feature to allow the user to build his library of cases as his collection grows. This buildable module technique promotes repeat purchases. It is well known that once a user starts with a certain storage system he tends to continue using this storage system for his collection.

A compact disc and data cartridge storage case has a base, a back, a front and first and second opposite sides. A plurality of parallel ribs extend along a rear portion of the base and a lower portion of the back for separating stored data packages. The base has a rear portion and a front portion respectively sloped rearward and forward from a center line which extends between the sides. The front portion is longer than the rear portion. Ribs extend upward from the front and rear position to guide and separate the data packages. In one form, the ribs extend fully along the back portion and partially along the front portion for storing tall and thin objects between the ribs. The stored packages lean against the back portion, with centers of gravity rearward of the central ridge. Selected thin objects are tipped forward, moving the center of gravity forward of the central ribs and allowing the thin objects to slide downward along the front portion of the base, while holding them vertically between the ribs. In one form, the ribs have a series of alternate short profile ribs and tall profile ribs. The short profile ribs are positioned nearest the sides and tall profile ribs are positioned intermediate the short profile ribs, with one more short profile rib than the number of tall profile ribs.

A preferred data media storage case apparatus has sides, a floor, a back and a front stop. The floor has a rearwardly tipped rear section and a forwardly tipped front section. The stop extends upward at the front of the front section. The front section and the rear section join at an upward apex. A distance of the front section from the apex to the stop is longer than a distance of the rear section from the apex to the back. Stored data media packages rest on the back section of the floor, sloping against the back. Selectively tipping forward upper corners of the stored media packages allows the packages to slide down the forward floor section to the stop. The sides of the selected and slid-forward packages are accessible for grasping and removing the packages from the case.

Ribs extend forward from the back and upward from the rear section and upward from an upper portion of the front section of the floor for separating stored media packages in the case.

In one embodiment, the ribs include a first set of ribs and a second set of ribs alternating between the first set of ribs. The second set of ribs extend forward from the back and upward from the rear section and from an upper portion of the front section of the floor to a lesser extent than extensions of the first set of ribs. The second set of ribs have upward apexes of extensions from the floor near an apex of the floor for supporting data cartridge packages in first positions on the second set of ribs and against the back. Upon forward tipping of upper edges of the stored data cartridge packages for the cartridge packages tip forward on the second set of ribs and slide forward on the second set of ribs and on the forward section of the floor toward and against the stop, as guided by the first set of ribs. The first set of ribs hold the selected data cartridge packages in second positions, with upper sides of the packages accessible for grasping and lifting the packages from the storage case.

The first and second set of ribs are spaced for guiding opposite sides of relatively thin jewel box storage covers for compact discs.

The first, larger set of ribs are spaced for guiding sides of data cartridge packages. Forward and rearward oriented ribs extend upward from the floor near the apex. The back slopes upward and rearward from a rear edge of the floor, and is perpendicular to the rear section of the floor. The front stop is perpendicular to the front section of the floor. Legs extend downward from the floor. Preferred storage cases have complementary lateral connectors on the sides for interconnecting sides of adjacent cases.

These and further and other objects and features of the invention are apparent in the disclosure, which includes the above and ongoing written specification, with the claims and the drawings.

DETAILED DESCRIPTION OF THE DRAWINGS

Figure 1:
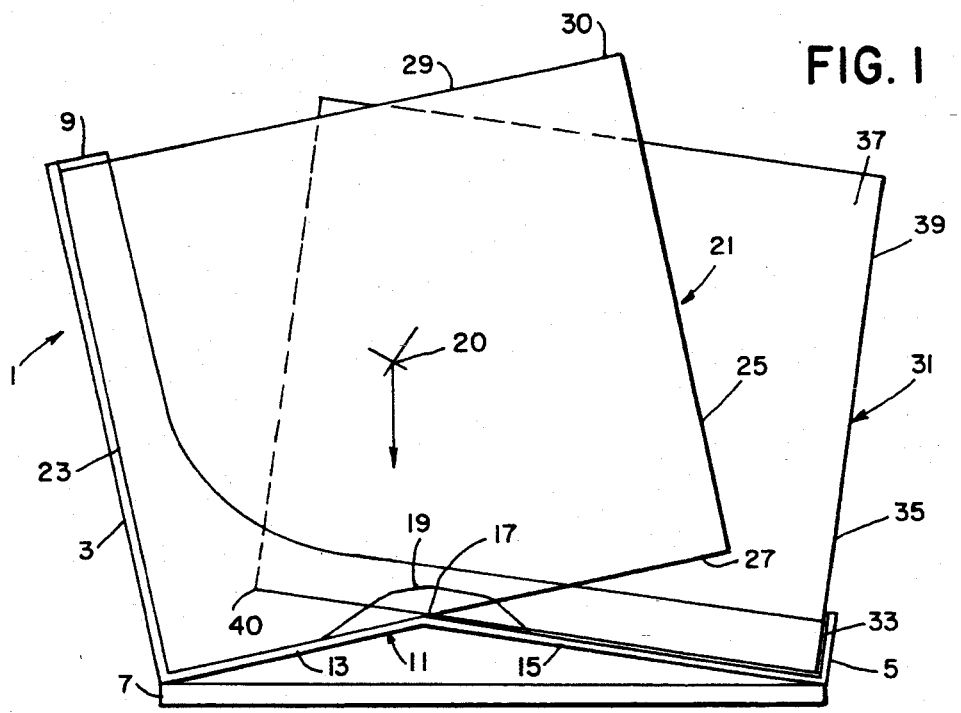
FIG. 1 is a sectional side elevational view of the slide storage case.

Referring to the drawings, the slide storage case is generally indicated by the numeral 1. The case has a sloping back 3, a sloping front stop 5, a base 7 and a top 9 at the top of the sides and the sloping rear wall 3. A floor, generally indicated by the numeral 11, has a rearward sloping section 13, a forward sloping section 15, which is longer than the rearward sloping section 13, and an apex 17. Ribs 19 are spaced vertically along the floor 11 near the apex 17 for laterally separating CD containing jewel boxes 21. As shown in FIG. 1, the apex 17 is located slightly rearward of a center of gravity 20 of a jewel box 21, which contains a compact disc. The rearward edge 23 of the jewel box rests against the sloping rear surface 3. The forward edge 25 of the jewel box 21 is projected upward and is sloped upward and rearward so that the spine is readily visible and a label on the spine is easily readable. The bottom 27 of the jewel box is sloped forward and upward, and a forward portion extends above a forward section 15 of floor 11 of the case 1. The top 29 of the jewel box slopes downward and rearward.

An upper corner 30 of the jewel box 21 is pressed downward to select the jewel box. The center of gravity 20 then shifts forward of the apex 17 of the floor, and the jewel box slides forward on the floor to a position shown by the jewel box 31, with a lower portion 33 of its front edge 35 resting against the front stop 5. The jewel box 31 is removed from the slide case by gripping the upper corners 37 and lifting the jewel box from the case. Then the compact disc is removed from the jewel box, and the box is returned into the position shown as 31.

After using the compact disc, the box 31 is again lifted from the case and the compact disc is returned to the box. Then the box 31 is returned to the case in the position shown, and the upper portion 37 of the front surface 35 is pushed rearward until the lower corner 40 contacts the rear wall 3. Continued pushing of the upper portion 39 of the front edge 35 rocks the box 31 into alignment with box 21.

The spines of the boxes are easy to read because of their upward and rearward slope, and the individual boxes are easy to select simply by pushing downward on the raised corner 30.

Figure 2:
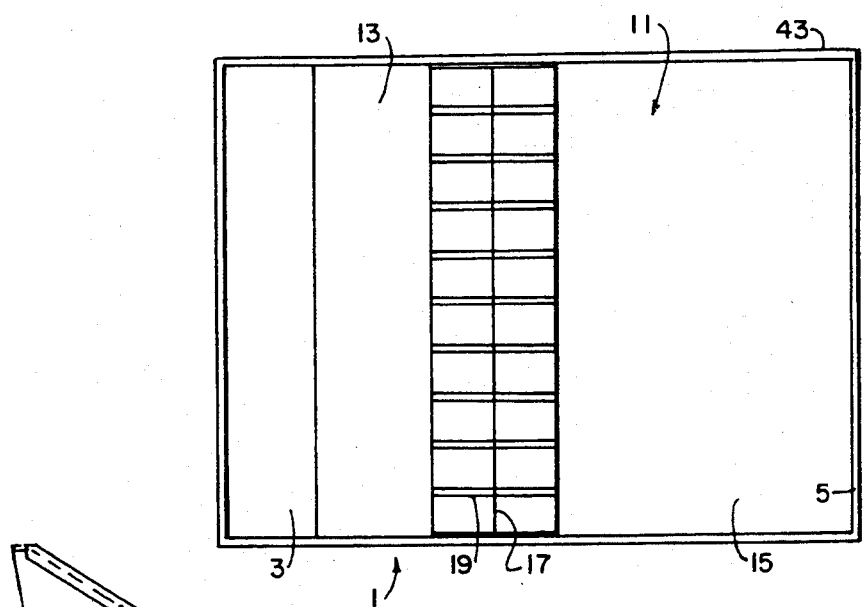
FIG. 2 is a top plan view of the storage case shown in FIG. 1.

FIG. 2 shows a plan view of the case 1, showing the left side 41 and the right side 43, the front stop 5 and the top 9 of the rear wall 3. The parallel ribs 19 extend forward and rearward from the apex 17 at the intersection of the rear section 13 and the front section 15 of the floor 11.

Figure 3:
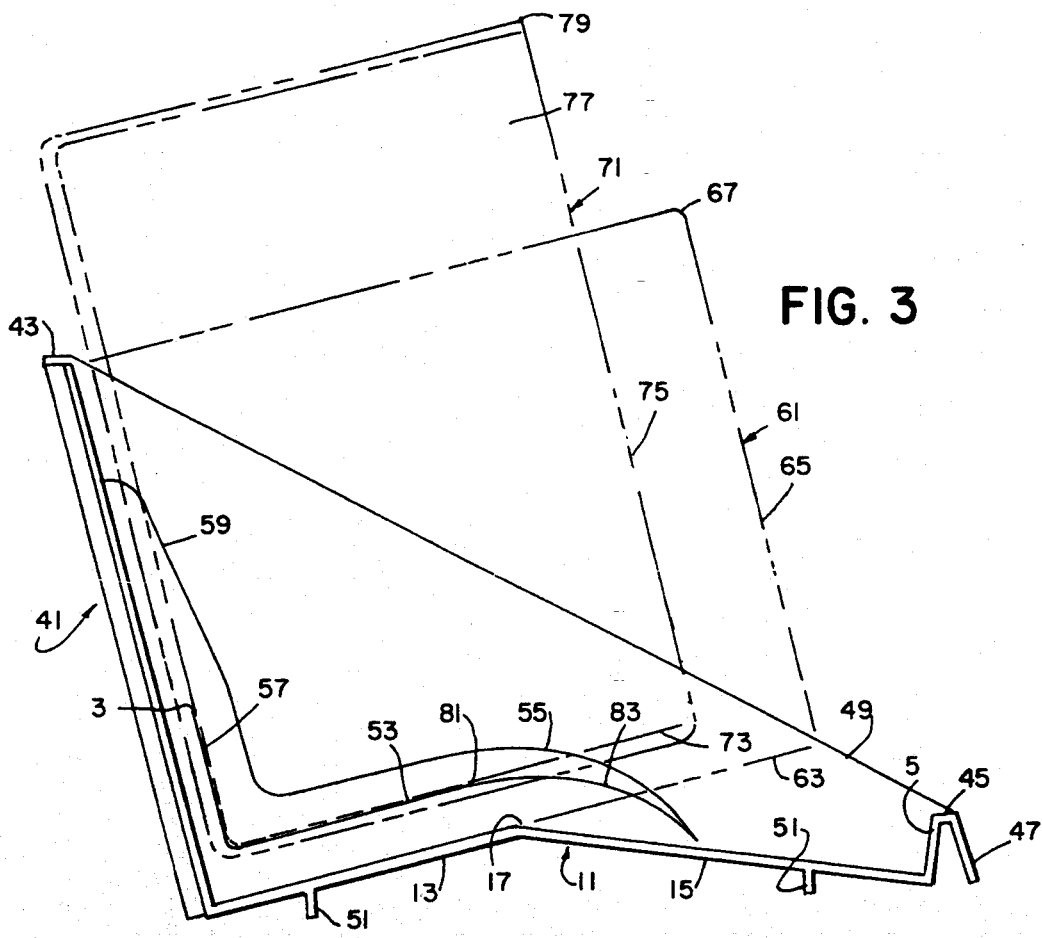
FIG. 3 is a sectional side elevation of a slide storage case suitable for storing packaged compact discs and data cartridges.

In the modified storage case 41 shown in FIG. 3, similar elements have similar reference numerals. The floor 11 has a rearward and downward sloping section 13, and the forward and downward sloping section 15. The sections are joined at an apex 17. A front stop 5 is perpendicular to the front section 15 of the floor. Rear wall 3 is perpendicular to the rear section 13 of the floor.

A top 43 of the rear wall projects slightly rearward, and a top 45 of the front wall projects forward. A front facing 47 extends downward from the outward projected front top 45, and sloping side walls 49 complete the case. Legs 51 are configured to receive rubber feet for resting the case on a desk. In the embodiment of the case 41 shown in FIG. 3, two sets of parallel ribs 53 and 55 are employed. Shorter ribs 53 extend over the rear section 13 of the floor and project forward over the upper part of the front section 15. Rearward sections 57 of the ribs 53 extend upward along the rear wall 3. The higher intermediate ribs 55 are alternately placed between the shorter ribs 53 and extend over the rear section 13 of the floor 11 and project forward over the upper part of the forward section 15 of the floor 11. Rear extensions 59 of the ribs 55 extend upward and forward from the rear wall 3.

As shown in FIG. 3, the storage cases 41 may be used interchangeably with CD jewel boxes 61 or data cartridge boxes 71. The ribs 53 and 55 are configured so that one storage case 41 may be used for CD jewel boxes 61 exclusively, or for data cartridges 71 exclusively, or for a mix of compact disc storage boxes 61 and data cartridge storage boxes 71.

As shown in FIG. 3, the rearward portions of the lower edges 63 of the CD jewel boxes 61 rest on the rearward section 13 of the floor 11. Labelled spines 65 slope upward and rearward for easy reading, and upper corners 67 are easily accessible for depressing to select a particular CD jewel box 61. When the upper corner 67 is depressed, the center of gravity of the CD jewel box moves forward of the apex 17. Edge 63 rests upon the front sloping section 15 of the floor 11, and the selected CD jewel box slides downward and forward along the front sloping section 15 until it reaches stop 5. The jewel box is removed and opened for access to the compact disc, and the jewel box is replaced in the case 41 in the forward and downward position. The jewel box is again lifted and opened to replace the CD, whereupon the jewel box is replaced in the case 41 and is slid rearward to its stored position.

Data cartridge package 71 has outer walls 77 and a spine 75. The outer walls 77 extend outward over the edges 73 as the package 71 is closed in the form of a book. The lower edge portion 73 rests upon the upper surfaces of ribs 53 and against the rearward portion 57 of the shorter ribs. The upper corner 79 of the data cartridge package 71 is pressed downward to select a particular data cartridge. Thereupon the center of gravity of the data cartridge package shifts forward in front of the apex 81 of the shorter rib 53, and the data cartridge package slides down the forward portion 83 of the shorter rib and down the lower portion of the front floor section 15 until the lower edge of spine 75 rests against stop 5. The package 71 is then ready to be withdrawn by grasping the outer walls 77 near the corner 79, and opening the package to remove the data cartridge. The package 71 is reinserted in the downward, forward position on the floor section 15 against stop 5 until the package 71 is lifted to open the package and replace the data cartridge. Then the data cartridge is placed back in the case on the front floor section 15. Rearward pressure against the spine 75 pushes the data cartridge up the slope 83 of the rib 53 until the center of gravity passes over the apex 81, and the data cartridge package 71 tips rearward against the rear portion 57 of the shorter rib.

The larger ribs 55 and rearward portions 59 of the larger ribs guide the data cartridge package 71 as it tips and slides forward and as it is slid rearward.

Figure 4:
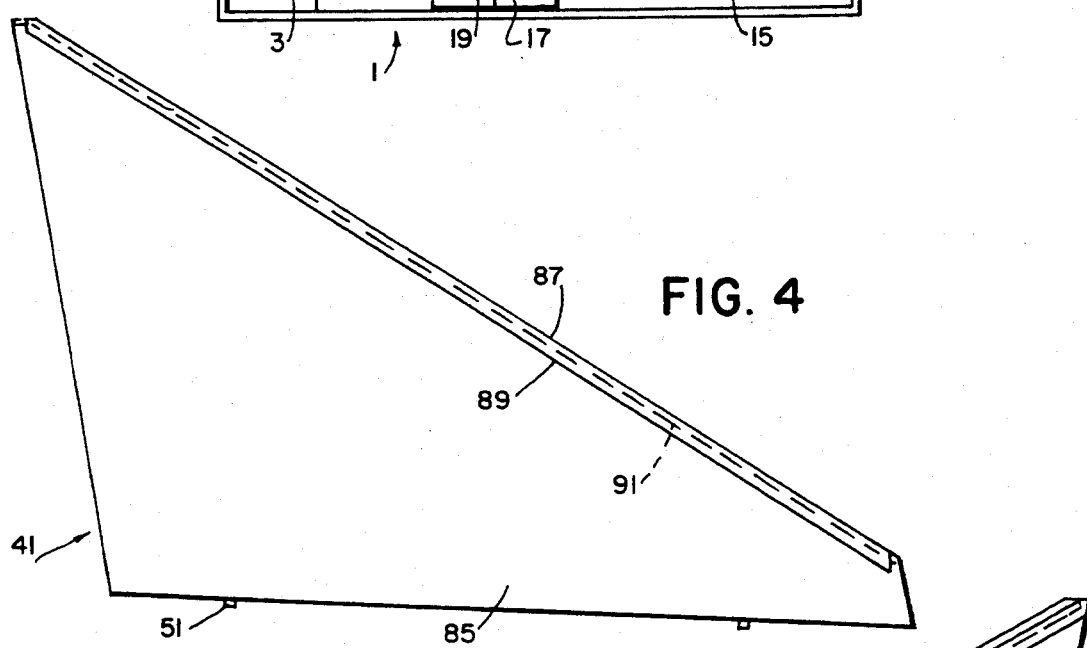
FIG. 4 is a left side elevation of the case shown in FIG. 3.

FIG. 4 is a left side view of the case 41 shown in FIG. 3. Feet 51 appear beneath the side wall 85. The top 87 of the side wall is formed with a downward extending flange 89 and a downward opening groove 91 to laterally interconnect an adjacent case.

Figure 5:
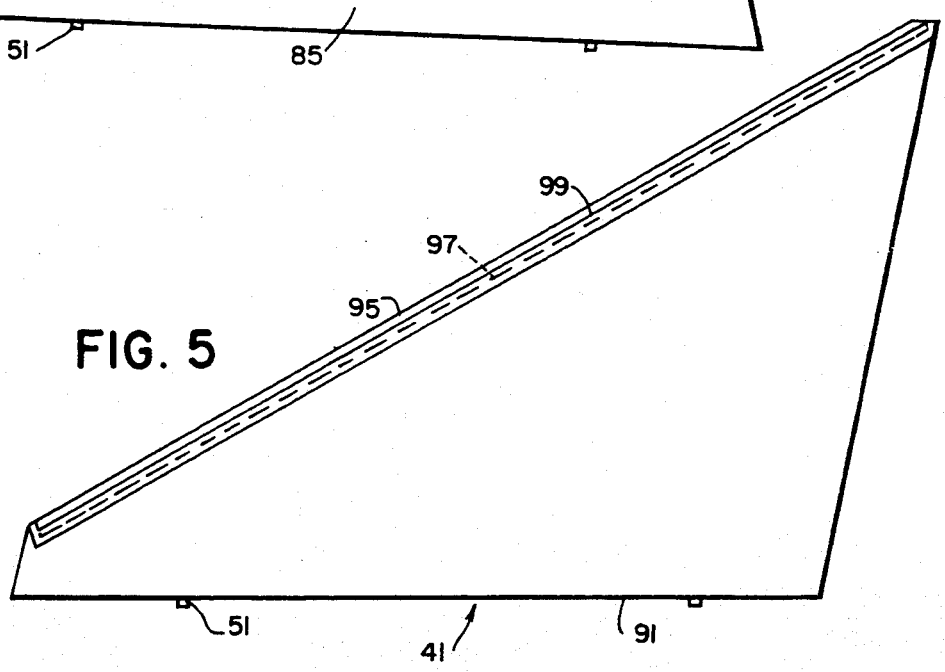
FIG. 5 is a right side elevation of the case shown in FIG. 3.

FIG. 5 shows a right side view of the case 41. The side 43 has a top 95, from which projects an upward opening groove 97 and an upward extending lip 99. The groove 97 receives the complementary flange 89 shown in FIG. 4. Ends of the flange 89 fit within the closed ends of the groove 97, locking the cases in side by side relationship. Upward extending lip 99 shown in FIG. 5 extends into the groove 91 shown in FIG. 4 to complete locking of adjacent cases.

Figure 6:
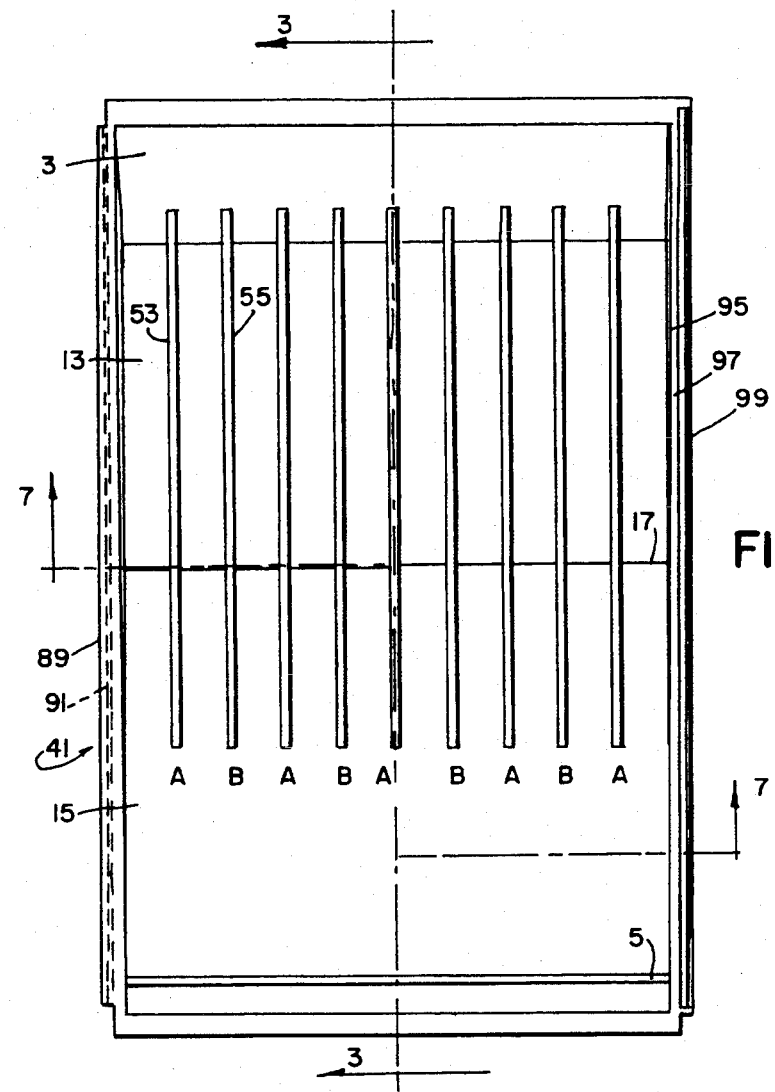
FIG. 6 is a top plan of the case shown in FIG. 3.

FIG. 6 shows a top plan view of the case 41 in which the alternating short ribs 53 are indicated by the letter A, and the interspaced large ribs 55 are indicated by the letter B.

The front floor 15 extends downward from apex 17, and the rear floor section 13 extends downward and rearward from the apex. As shown in FIG. 6, the ribs 53 and 55 extend to the same extent along the back wall 3 as a suitable modification of FIG. 3, in which the rear portion of the ribs extend to different positions along the back wall.

The downward extending flange 89 and downward opening groove 91 are shown at the left, and the upward opening groove 97 and upward extending lip 99 are shown adjacent the top 95 of the right side. Section lines 3—3 indicate the view of FIG. 3, and section line 7—7 represents the view shown in FIG. 7.

Figure 7:
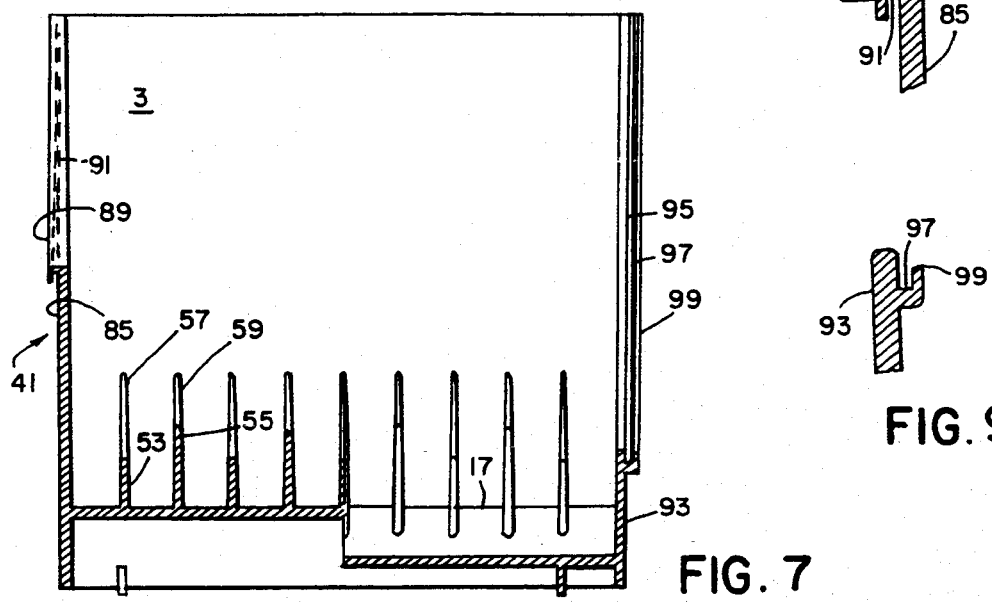
FIG. 7 is a front elevation and partially cross-sectional view of the case shown in FIG. 3 taken along lines 7—7 of FIG. 6.

FIG. 7 is a left side of the storage case and the downward extending flange 89 and the downward opening groove 91. FIG. 7 also shows the right side 93 with the sloping upper edge 95, and the upward opening groove 97 and upward extending lip 99, which interfit with the structure at the upper edge of an adjacent similar case.

FIG. 7 also shows the apex 17 and the short ribs 53 and tall ribs 55, with upward extensions 57 and 59 along the back wall 3.

Figure 8:
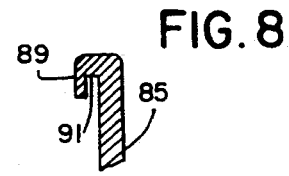
FIG. 8 is a is a detail of the left side downward opening interconnection shown in cross-section.

FIG. 8 is a detail of a top of the left side wall 85 showing the downward opening groove 91 and the downward extending flange 89.

Figure 9:
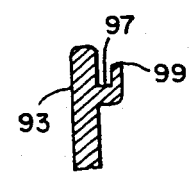
FIG. 9 is a detail of the right side complementary upward opening interconnection shown in cross-section.

FIG. 9 is a detail of the right side 93 showing the upward opening groove 97 and the upward extending lip 99, which engage the groove and flange structure shown in FIG. 8.

While the invention has been described with reference to specific embodiments, modifications and variations of the invention may be constructed without departing from the scope of the invention, which is defined in the following claims.

We claim:

1. Data media storage case apparatus, comprising sides, a floor, a back and a front stop, the floor having a rearwardly tipped rear section and a forwardly tipped front section, the stop extending upward at a front of the front section, the front section and the rear section having an upward apex, a distance of the front section from the apex to the stop being longer than a distance of the rear section from the apex to the back for holding stored data media packages on the back section of the floor sloping against the back, and for selectively tipping forward upper corners of the stored media packages and sliding the packages down the forward section to the stop, whereupon sides of the packages are accessible for grasping and removing the packages from the case.

2. The storage case apparatus of claim 1, further comprising ribs extending forward from the back and upward from the rear section and upward from an upper portion of the front section of the floor for separating stored media packages in the case.

3. The storage case apparatus of claim 2, wherein the ribs comprise a first set of ribs and further comprising a second set of ribs alternating between the first set of ribs, the second set of ribs extending forward from the back and upward from the rear section and from an upper portion of the front section of the floor to a lesser extent than extensions of the first set of ribs, the second set of ribs having upward apexes of extensions from the floor near an apex of the floor for supporting data cartridge packages in first positions on the second set of ribs and against the back, and for permitting forward tipping of upper edges of the stored data cartridge packages for tipping forward on the second set of ribs and for sliding forward on the second set of ribs and on the forward section of the floor toward and against the stop, as guided by the first set of ribs, for holding the data cartridge packages in second positions with sides of the packages accessible for grasping and lifting the packages from the storage case.

4. The storage case apparatus of claim 3, wherein the first and second set of ribs are spaced for guiding opposite sides of relatively thin jewel box storage cases for compact discs.

5. The storage case apparatus of claim 3, wherein the first set of ribs are spaced for guiding sides of data cartridge packages.

6. The storage case apparatus of claim 1, further comprising forward and rearward oriented ribs extending upward from the floor near the apex.

7. The storage case apparatus of claim 1, wherein the sides extend forward from an upper edge of the back to the stop.

8. The storage case apparatus of claim 1, wherein the back slopes upward and rearward from a rear edge of the floor.

9. The storage case apparatus of claim 1, wherein the back is perpendicular to the rear section of the floor.

10. The storage case apparatus of claim 1, wherein the front stop is perpendicular to the front section of the floor.

11. The storage case apparatus of claim 1, further comprising legs extending downward from the floor.

12. The storage case apparatus of claim 1, further comprising complementary lateral connectors on the sides for interconnecting sides of adjacent cases.

13. Recorded media storage case apparatus, comprising sides, a floor, a back and a front stop, the floor having a rearwardly tipped rear section and a forwardly tipped front section, the stop extending upward in front of the front section, the front section and the rear section having an upward apex and a distance of the front section from the apex to the stop being longer than a distance of the rear section from the apex to the back, for holding recorded media packages on the back section of the floor sloping against the back, and for selectively tipping forward upper corners of the stored media packages and sliding the packages downward along the forward section of the floor to the stop, whereupon sides of the packages are accessible for grasping and removing the packages from the case.

14. The apparatus of claim 13, further comprising ribs extending forward from the back and upward from the rear section and upward from an upper portion of the front section of the floor for separating stored media packages in the case.

15. The apparatus of claim 13, wherein the ribs comprise a first set of ribs and further comprising a second set of ribs alternating between the first set of ribs, the second set of ribs extending forward from the back and upward from the rear section and from an upper portion of the front section of the floor to a lesser extent than extensions of the first set of ribs, the second set of ribs having upward apexes of extensions from the floor near an apex of the floor for supporting data cartridge packages in first positions on the second set of ribs and against the back, and for permitting forward tipping of upper edges of the stored data cartridge packages for tipping forward on the second set of ribs and for sliding forward on the second set of ribs and on the forward section of the floor toward and against the stop, as guided by the first set of ribs, for holding the data cartridge packages in second positions with sides of the packages accessible for grasping and lifting the packages from the storage case.

16. The storage case apparatus of claim 13, further comprising complementary lateral connectors on the sides for interconnecting sides of adjacent cases.

17. The apparatus of claim 16, wherein the connectors comprise downward opening troughs on upper edges of first sides and complementary upward opening troughs on upper edges of second sides.

18. A compact disc and data cartridge storage case, comprising a base, a back, a front and first and second opposite sides, and a plurality of parallel ribs extending along a rear portion of the base and a lower portion of the back for separating stored data packages, the ribs comprising a series of alternate short profile ribs and tall profile ribs, with short profile ribs positioned nearest the sides and tall profile ribs intermediate the short profile ribs with one more short profile rib than tall profile rib, the base having a rear portion and a front portion respectively sloped rearward and forward from a center line which extends between the sides, the front portion being longer than the rear portion and the ribs extending fully along the back portion and partially along the front portion for storing tall and thin objects between the ribs, leaning against the back portion with centers of gravity rearward of the central ridge before tipping selected thin objects forward and moving the center of gravity forward of the central ribs and allowing the thin objects to slide downward along the front portion of the base while held vertically between the ribs.

* * * * *